US005498761A

United States Patent [19]
Wessling et al.

[11] Patent Number: 5,498,761
[45] Date of Patent: Mar. 12, 1996

[54] PROCESS FOR PRODUCING THIN LAYERS OF CONDUCTIVE POLYMERS

[76] Inventors: Bernhard Wessling, Wiesenweg 38, D-2072 Bargteheide; Holger Merkle, Wulfsdorfer Str. 88, D-2070 Ahrensburg, both of Germany

[21] Appl. No.: 320,839

[22] Filed: Oct. 7, 1994

Related U.S. Application Data

[63] Continuation of Ser. No. 108,003, Aug. 18, 1993, abandoned, which is a continuation of Ser. No. 543,830, Aug. 3, 1990, abandoned.

[30] Foreign Application Priority Data

Oct. 11, 1988 [DE] Germany ............................ 38 34 526.9
Feb. 3, 1989 [DE] Germany ............................ 39 03 200.0
Mar. 9, 1989 [DE] Germany ............................ 39 07 603.2

[51] Int. Cl.$^6$ ............................ B29C 71/02; B05D 3/06; B05D 3/02; H01B 1/06
[52] U.S. Cl. ............................ 427/542; 427/541; 427/544; 427/557; 427/377; 427/388.4; 427/388.5; 252/511
[58] Field of Search ............................ 427/541, 542, 427/544, 545, 557, 559, 377, 379, 384, 388.4, 388.5, 385.5, 381; 252/500, 510, 511

[56] References Cited

U.S. PATENT DOCUMENTS

| 3,674,711 | 7/1972 | Growald et al. | 252/500 |
| 4,294,739 | 10/1981 | Upson et al. | 252/500 |
| 4,877,646 | 10/1989 | Kuhn et al. | 427/121 |
| 4,929,388 | 5/1990 | Wessling | 252/500 |
| 4,935,164 | 6/1990 | Wessling et al. | 252/500 |
| 4,959,162 | 9/1990 | Armes et al. | 252/500 |
| 4,963,206 | 10/1990 | Shacklette et al. | 427/163 |
| 4,981,718 | 1/1991 | Kuhn et al. | 427/121 |
| 5,006,278 | 4/1991 | Elsenbaumer | 252/500 |
| 5,028,354 | 6/1991 | Smith et al. | 252/500 |
| 5,112,450 | 5/1992 | Jasne | 252/500 |
| 5,182,050 | 1/1993 | Joyce, Jr. et al. | 252/500 |
| 5,290,483 | 3/1994 | Kulkarni et al. | 252/500 |
| 5,294,372 | 3/1994 | Kochem et al. | 427/384 |

FOREIGN PATENT DOCUMENTS

| 160207 | 11/1985 | European Pat. Off. . |
| 2616790 | 12/1988 | France . |
| 3317761 | 12/1983 | Germany . |
| 3708706 | 10/1988 | Germany . |

*Primary Examiner*—Marianne Padgett
*Attorney, Agent, or Firm*—Cushman Darby & Cushman

[57] ABSTRACT

The present invention relates to a process which comprises the steps of producing moldings from intrinsically conductive polymers on a substrate, the moldings being conductive layer components having a specific conductivity of $>10^{-2}$ S/cm, by depositing a predetermined amount of a metastable dispersion of the intrinsically conductive polymers to form the conductive component.

27 Claims, No Drawings

PROCESS FOR PRODUCING THIN LAYERS OF CONDUCTIVE POLYMERS

This is a continuation of application Ser. No. 08/108,003, filed on Aug. 18, 1993, which was abandoned upon the filing hereof which was a continuation of application Ser. No. 07/543,830, filed Aug. 3, 1990, abandoned.

DEFINITIONS—EXPLANATION OF TERMS

The term "intrinsically conductive polymers" (ICP) refers to organic polymers which have polyconjugated bond systems (e.g. double bonds, aromatic or heteroaromatic rings or triple bonds). Examples of such polymers are polydiacetylene, polyacetylene (PAc), polypyrrole (PPy), polyaniline (PAni), polythiophene (PTh), polyisothianaphthene (PITN), polyheteroarylene-vinylene (PArV), in which the heteroarylene group can be, e.g. thiophene or pyrrole, poly-p-phenylene (PpP), polyphenylenesulphide (PPS), polyperinaphthalene (PPN), polyphthalocyanine (PPhc) etc. and their derivatives (formed, for example, from substituted monomers), their copolymers and their physical compounds. They can exist in various states, each described by different empirical formulae, which can for the most part be converted essentially reversibly into one another by (electro-)chemical reactions such as oxidation, reduction, acid/alkali reaction or complexing. These reactions are also occasionally known as "doping" or "compensation" in the literature, or can be regarded as "charging" and "discharging" in analogy with the electrochemical processes in batteries. At least one of the possible states is a very good conductor of electricity, e.g. has a specific conductivity of more than $10^{-2}$ S/cm in pure form, so one can speak of intrinsically conductive polymers.

A good overview of the intrinsically conductive polymers synthesised to date which are suitable according to the invention can be found in Synthetic Metals, Nos. 17, 18 and 19 (1987).

STATE OF THE ART

The processing of intrinsically conductive polymers (ICP) is a sub-branch of the research into conductive polymers which has grown in importance in recent, years, because the films originally considered adequate which could be obtained primarily by electro-polymerisation, have proved unsuitable for most of the technical applications considered outside the battery sector.

The works of B. Wessling inter alia (EP-A-168 621, EP-A-168 620, EP-A-181 587, DE-A-37 29 566) make it possible to process the polymers in pure form and as polymer blends into finished parts in a variety of forms, but not however into products in which the ICP is required as a firmly adhesive thin layer on a substrate or moulding. Thin layers are understood to be those which have a thickness of not more than 10 µm, preferably not more than 1 um. Such layers are required, e.g. as transparent conductors or for transparent antistatic finishing, as functional layers on semi-conductors or glasses, for the modification of electrode surfaces and ceramics or for other purposes. In many cases ultra-thin layers are required with a thickness of less than 400 nm.

From the works cited above and the other literature one can derive either no satisfactory processes for solving the problem or only processes suitable for special cases:

(1) D. Whitney, G. Wnek Mol. Cryst. Liq. Cryst. 121, 313 (1985) Undoped PAc is adsorbed on $SiO_2$ particles during polymerisation (chemical precipitation). Non-organofunctional silylated $SiO_2$ is not suitable because PAc which is polymerised on untreated $SiO_2$ de-laminates immediately the particles are suspended in water. PAc only adsorbs sufficiently during the polymerisation when there is a suitable glass coating.

(2) S. Armes et al. J. Colloid Interface Sci. 118, (2), 410 (1987) An aqueous colloidal PPy dispersion sterically stabilised by polyvinyl alcohol is produced. The work does not give any indication that this dispersion might be suitable for the production of thin layers on diverse substrates.

(3) T. Skotheim U.S. Pat. No. 4,352,868 The aim is a thin, highly conductive polymer layer on a semiconductor: a) thin layers are electrochemically grafted or b) chemically or electrochemically polymerised after the application of a polyelectrolyte film of a few µm thickness in the film matrix.

(4) F. Garnier, G. Horowitz Synth. Met. (in press, lecture and poster at the ISCM Santa Fe 1988, Abstracts p. 257, 265 and 266). The authors describe and discuss the electrochemical deposition of polythiophenes and the deposition of soluble PTh oligomers by vacuum evaporation (see below) on semiconductors.

(5) K. Uvdal, M. Löglund, J. -O. Nilsson, W. Salaneck Synth. Met. (in press, poster at the ISCM Santa Fe, 1988, Abstracts p. 283) PAni is evaporated in an ultra-high vacuum at approx. 350° C. and deposited on substrates. The disadvantage of this process is in the high cost of equipment and in the fact that obviously only oligomers can be deposited. Nothing is known about the possibility of using substrates other than quartz.

(6) R. Elsenbaumer, K. Jen, R. Oboodi Synth. Met. 15, 169 (1986); loc cit 18, 277 (1987) Soluble polyalkylthiophenes which can be applied to substrates as thin transparent layers (adhesive strength not known) and have average to good conductivity. Disadvantage: costly production of the monomers and the polymers.

Similar polyalkylthiophenes have also been used on a trial basis for the manufacture of field-effect transistors in research (P. Kuivalainen et al., 13th. Nordic Semiconductor Meeting, Stockholm, 5th.–8th. June 1988).

(7) M. Feldhues, G. Kämpf, T. Mecklenburg, P. Wegener EP-A-257 573, see also poster at the symposium of the Federal Ministry for Research and Technology of the Federal Republic of Germany "Materialforschung 1988". Soluble polyalkoxythiophenes (initial conductivity approx. $10^{-3}$ to $10^{-5}$ S/cm), which can be processed into transparent thin layers by solvents on polyethyl terephthalate (PET) films, but which have only extremely low conductivities ($10^{-6}$ to $10^{-9}$ S/cm). Additional disadvantage: enormous costs due to difficult accessibility of the monomers (expected polymer costs about 1000 DM/kg).

(8) S. Jasne, C. Chiklis Synth. Met. 15, 175 (1986) PPy grafted on to latex particles; spin coating of transparent antistatic layers; Disadvantages: low conductivities (only approx. $10^{-9}$ S/cm) and relatively large particle size (0.5 to several µm thick), the presence of a second polymer (the latex polymer) and as a result the limiting of possible uses to only a few cases.

(9) R. Bjorklund, B. Liedberg J. Chem. Soc., Chem. Com. 1293 (1986) Colloidal solutions are produced from PPy-methylcellulose blends of different PPy-concentrations in aqueous medium; the films produced therefrom are approx. 10 µm thick and not transparent; the adhesive properties are determined by the methylcellulose matrix (therefore, e.g. poor stability in ambient humidity, in aqueous or polar systems etc.).

(10) B. Wessling, H. Volk, S. Blaettner European published application 329 768 The authors report on experiments for the production of dispersible ICP solids, in which with the aid of polyvinylpyrrolidone a steric stabilisation of polypyrrole is achieved during the polymerisation. These dispersions could not be cleaned of reaction by-products and waste products and when the non-filtratable dispersions were dried no re-dispersible solid was formed. When the dispersions were applied to substrates, no transparent or good adhesive or good conductive thin layers of pure PPy were obtained. These works gave no assistance for achieving the present aim.

(11) W. Huang, J. Park J. Chem. Soc., Chem. Com.(11), 856 (1987) Soluble, random block copolymers of 3-methylthiophene and methylmethacrylate with a conductivity of only $10^{-2}$ and $10^{-5}$ S/cm respectively were synthesised, which are soluble and therefore can be processed, a layer (no details of the thickness were given) was applied to a Pt electrode to investigate the electrochemical properties of the polymer. Disadvantages: expensive, copolymer difficult to access, low conductivity.

(12) M. Schnöller, W. Wersing, H. Naarmann DE-A-36 30 708, see also Makromol. Chem., Macromol. Symp. 8, 83 (1987) The authors describe a process for the production of a composite material, which can be used for the coating of a ceramic component (piezo-ceramic), in which the surface of the ceramic material is coated with the monomer which is then polymerised. In principle this is a chemical precipitation or coating process. (The process is also described in reverse: a layer of the solution of the oxidation and doping agent is prepared and this layer is brought into contact with the monomer). The electrochemical deposition has the disadvantage of having a relatively high equipment cost on an industrial scale, the problem with the chemical precipitation described is that the layer formed cannot be cleaned sufficiently of the reaction by-products and waste products. Thiophene or azulene or their derivatives are also used, as well as pyrrole.

(13) A. Tsumura, M. Tsunoda, Y. Hizuka, T. Ando JP-A-61/202469 The inventors describe a method for the manufacture of a field-effect transistor in which the semiconductor to be coated is immersed in an aqueous solution of an oxidation agent (e.g. $FeCl_3$), after which an aqueous solution of N-methylpyrrole is added. After 2 hours a thin layer has been deposited. The coated semiconductor is dried in a vacuum. The disadvantage of this chemical coating technique is in the impurity of the layer (a rather high proportion of carbonyl groups, iron content, see Chemistry Letters, Chem. Soc. Jap. 863 (1986)), for which reason the inventors in later works have clearly moved over to electrochemical coating techniques and to other polymers (JP-A-63/14471, 63/14472, 62/31174 and H. Koezuka et al., Appl. Phys. Lett. 49, 1210 (1986)). A further disadvantage of the process described is that "intrinsically conductive polymers (ICP)" in the sense of the above definition cannot be used and the deposited layers therefore have a conductivity of only approx. $10^{-5}$ S/cm.

In summary it can be said that as yet no technically satisfactory solution has been found for the application of thin layers of conductive polymers to different substrates. The essential disadvantages of the previously described techniques are:

that they are uneconomical due to the enormous cost of the monomers or polymers (primarily for soluble polymers and copolymers)

uneconomical due to high cost of equipment (electrochemical deposition or vacuum-sputter technique)

uneconomical due to insufficiently wide field of application of the process;

the layer thickness is too great or not sufficiently controllable the lack of chemical purity of the layer (too high a proportion of by-products and reaction waste products) primarily in chemical but also in electrochemical coating techniques insufficient adhesiveness.

It is therefore the objective of the invention to describe a process which is as widely applicable as possible, for the production of thin and ultra-thin layers on as many substrates as possible. If only one raw material could be used for completely different processes for producing the layer, this in itself would constitute a great simplification. The objective can therefore be summarised as the provision of a process for the production of thin or ultra-thin layers which is based on the use of a certain type of ICP-raw material.

It was surprisingly found that thin or ultra-thin layers with good adhesion and with a specific conductivity $>10^{-2}$ S/cm can be produced in a controlled manner (particularly by varying the conditions such as temperature or length of the coating process) when the conductive components are formed by deposition from a meta-stable dispersion of the intrinsically conductive polymers.

It is in particular surprising that the polymer can be deposited on the substrate without electric current, such that a layer is formed with a thickness and density which are not directly dependent on the concentration of the dispersion, i.e. a concentration gradient of the conductive polymers forms between the dispersion and the contacted substrate, so that a high concentration forms at the boundary surface.

An ICP dispersion is described as "stable" when in practicable observation periods it shows no signs of separation, even when there are changes of temperature or when in a centrifuge. ICP dispersions are "meta-stable" when they are stable only under certain conditions, i.e. they do not flocculate, separate, discolour or settle out under those certain conditions. Meta-stable dispersions are stable under normal conditions, e.g. at room temperature, but become unstable under other conditions, e.g. when the temperature rises or falls or—as is generally the case in the process according to the invention—immediately after the dispersion contacts the substrate.

The meta-stability of the dispersions according to the invention does not however show itself in most cases in flocculation or the like, but in the deposition without electric current of the ICP from the dispersion on the substrate.

As the ICP raw material, insoluble intrinsically conductive polymers are used in the form of dispersible solids, as described in DE-A-37 29 566 and European published application 329 768. Raw materials are also suitable in the form described in EP-A-168 620, but the former are preferred. Insoluble ICPs which were not produced according to the given specifications can admittedly also be used but the yield on dispersion is considerably poorer.

For the dispersions, the low-molecular organic solvents or aqueous media commonly used, particularly water, can be considered. The principles of the production of these dispersions, or of the dispersible polymers, are described in EP-A-168 620 and European published application 329 768.

The dispersions are meta-stable with at least some of the ICP solids existing in dispersed form when brought into contact with the substrate. For this reason it is also possible in some circumstances to immerse substrates when the polymerisation is in process (the polymerisation process is described in European published application 329 768) and to coat them in this way. It is essential here not to use a chemical deposition technique described in the literature (see "State of the Art", No. 1, 12 and 13) but to bring about a deposition from the (aqueous) dispersion during the polymerisation. For this one must keep to the process parameters for polymerisation described in European published application 329 768, so that a dispersible solid forms which can be deposited on a substrate. The deposition can then also take place during the polymerisation of further quantities of the dispersible ICP. This process is however less preferred for processing reasons.

It is preferred for the ICP in the form of dispersible solids as described in European published application 329 768 to be dispersed in water or organic solvents (such as alcohols, ethers, DMF, DMSO, etc.)—small quantities of dispersion aids can also be used here—and for the dispersion to be brought into intensive contact with the substrate to be coated. Dispersions of the compensated forms of the ICP in question can also be used.

The production of the dispersions can take place according to the specifications in EP-A-168 620. According to this all solvents with a solubility parameter of $>8.6$ $[cal/cm^3]^{1/2}$, are in principle suitable, including in particular alcohols, esters, ethers (such as, e.g., THF or dioxan), solvents containing nitro-groups (such as nitromethane, nitropropane, nitrobenzene), DMF, DMSO, acetonitrile, $H_2O$, halogenated solvent, malodinitrile, butyrolactone, etc. Mixtures of these solvents can also be used.

Meta-stable dispersions are obtained when the conductive ("doped") forms of the intrinsically conductive polymers are dispersed in one of the solvents listed. The neutral forms on the other hand form mainly stable dispersions. Not all meta-stable dispersions are equally well suited for coating purposes. Solvents with a solubility parameter only just above 8.6, particularly those with a low polarity proportion, are capable of dispersing only little ICP (i.e. the concentration of dispersed ICP is too low), and the meta-stability is particularly highly marked (e.g. simultaneous flocculation processes on contact with a substrate).

Thus those meta-stable dispersions are preferred in which the meta-stability if possible leads exclusively to the deposition of the ICP layer on the substrate. Such meta-stable dispersions according to the invention can preferably be produced by using for the dispersion mixtures of solvents which yield a stable dispersion (e.g. DMF, DMSO) with those in which particularly meta-stable dispersions exist (e.g. alcohols, ethers). Examples 8 and 9 describe particularly preferred embodiments.

A possible procedure for producing the suitable dispersions consists in converting an already polymerised, cleaned and if necessary dried, conjugated organic polymer in neutralised (not complexed) form in as high a concentration as possible into a pre-dispersion by dispersing the polymer in DMSO, DMF, THF or another solvent with a comparable or higher solubility parameter. The dispersion is then diluted with the same solvent or solvent mixture or with another solvent (mixture) with a solubility parameter of $>8.6$ $[cal/cm^3]^{1/2}$, whereupon the neutral conjugated polymer is, if necessary, converted with an acid into the conductive complexed form.

Corresponding to the aforementioned EP-A-168 620 it is advantageous, but not however absolutely necessary, to support the dispersion process by supplying energy, e.g. by ultrasound, with an Ultraturrax or the like. Dispersion aids can only be used to a limited degree, provided that they do not hinder the layer formation. Preferred are the dispersion aids which can simultaneously have "doping" (i.e. complexing, oxidation or protonation) functions, such as for example dodecylbenzenesulfonic acid (DBSH).

The dispersions can additionally also contain fill-forming polymers, if after the formation of the thin ICP layer on the substrate another protective layer is required on the latter. The polymeric protective layer can of course also be applied as a separate stage after the ICP-layer formation and the heat treatment, in many cases it proves more practicable however to effect the ICP-layer formation by deposition without electric current from a meta-stable dispersion, which already contains fill-forming polymers, in which first the ICP layer is deposited and then during removal and drying of the dispersion agent the polymeric protective film is formed. For the polymers, all film-forming polymers which are soluble or dispersible in the dispersion agents can be considered, preferred are vinyl acetate/vinyl chloride copolymers, polyurethanes, etc.

The concentration of the dispersed conductive polymers in the solvents can be selected within in a very wide range, from almost zero (e.g. $10^{-5}\%$) to over 5%. On the one hand there are economic reasons which make a maximisation of the concentration appear desirable, however gel formation, flocculation, flow problems and fill-formation problems frequently prevent the use of higher concentrations. On the other hand, it is advisable in many cases (if the production of extremely even layers is desired) to use particularly low concentrations, however, particularly long contact times are necessary when this is the case.

While the above specifications are in general sufficient for the production of suitable dispersions for the coating, it is advantageous to use special variants if one wishes to set extremely high or particularly low or exactly reproducible concentrations. In the former case neutral compensated PAni is firstly dispersed (or $NH_3$ is fed into a super-concentrated suspension/dispersion of complexed PAni) in one of the aforementioned solvents, particularly THF, DMSO, DMF and $H_2O$, any undispersed parts are filtered or centrifuged off and the dispersion is then precisely doped. The concentration can be determined by measuring the residue after drying. This production variant is also suitable for setting precisely measured concentrations. If particularly low concentrations are desired then the dispersion of a beginning polymerisation is preferably used. For this the polymerisation conditions are selected as in European published application 329 768, but the addition of the oxidation agent is suspended after some time. The dispersion formed is coating-active and suitable for the production of particularly regular coatings.

All the polymers that come under the definition of "intrinsically conductive polymers" given in the introduction are suitable, their reversibly doped (complexed, oxidised, protonated) conductive forms are preferred. The polymers preferably do not contain any counter-ions with a molecular weight of more than 1000. In addition, ICPs are preferred which are insoluble in organic solvents or are soluble only in very few solvents, e.g. in those with a solubility parameter of $\leq 11$ $[cal/cm^3]^{1/2}$. Suitable polymers are, e.g. polydiacetylene, polyacetylene (PAc), polypyrrole (PPy), polyaniline (PAni), polythiophene (PTh), polyisothianaphthene (PITN), polyheteroarylenevinylene (PArV), in which the heteroarylene group can be, e.g. thiophene or pyrrole, poly-p-phenylene (PpP), polyphenylenesulfide (PPS), polyperinaphthalene (PPN), polyphthalocyanine (PPhc) and other conjugated polymers their derivatives (i.e. polymers of derivatives of the monomers forming the above polymers) and their copolymers and their physical mixtures with each other. Polyaniline is particularly preferred.

In general, all polymers are suitable which can be converted by a reversible oxidation or reduction and/or by reversible protonation or by other derivative-forming reactions (which can sometimes be described as complexing or compensation reactions) into conjugated, positive or negative charged polymer chains (the charge of which is compensated by counter-ions) whereby the polymer can exist in states of different conductivity (which are usually of a different chemical composition). Preferred are polymers with a conductivity which can exceed $10^{-2}$ S/cm.

The intrinsically conductive polymers can be obtained, according to the application, in neutral, reduced or oxidised form or protonated/deprotonated form and can be processed in the other processes and used.

Colloidal dispersions stabilised e.g. sterically with PVA or PVP are less well suited. These sometimes do not adhere well to the substrates or—if the substrates are coated with the dispersions and then dried—they yield irregular layer thicknesses, inadequate conductivities and a layer "polluted" with the steric stabiliser which makes them unsuitable for many uses.

It is important for the success of the process to control the residence time and the temperature during coating. When dispersions in solvents are used the residence time should not exceed 10 to 60 sec. The longer the residence time selected, the thicker and denser the layers formed become and the higher the conductivity values that can be obtained. For a controlled formation, the coating can also be effected several times, each time with careful drying.

When the substrate is brought into contact with the ICP dispersion, the layer of conductive polymer deposits. When the deposition is complete the dispersion is removed. Dispersions in water or solvents are drained off and the solvent(s) carefully removed.

Following this the drying or heat-treatment stage is carried out. This stage of the process is an important stage for the adhesion of the deposited layer to the substrates. In many cases the heating necessary for drying represents the heat-treatment essential in the invention. In critical cases it is advisable however to carry out the drying extremely carefully, so as not to disturb or destroy the structure of the layer and the bond with the substrate. In these cases the heat-treatment stage is a separate stage which is carried out at over 60° C., preferably over 80° C., in particularly demanding cases over 120° C., but always below the decomposition temperature. The substrate with the applied layer is heated, for example, by direct contact with a heat source or by infra-red radiation or by microwaves. The duration depends on the adhesion strength and scratch resistance requirements and is greater than 1 minute. The longer the heat-treatment lasts and the higher the temperatures applied, the more advisable it is to carry out this stage under an inert atmosphere ($N_2$, noble gases) or under reduced pressure (vacuum).

The success of this heat-treatment stage can be seen in the fact that subsequently the layers applied cannot be detached from the substrate at all or only with great difficulty even with the solvents used for the dispersion or water. They sometimes (according to the substrate) have very great resistance to abrasion (e.g. on PC and on metals), sometimes adequate resistance (e.g. on PET and glass) or are less resistant (e.g. on PE).

According to an alternative embodiment it is possible to bring the substrates into contact at temperatures above 25° C. In some circumstances it is thus possible for the heat treatment to be carried out during the deposition of the layer.

With the help of the process according to the invention, extremely thin layers can be produced but layers up to a layer thickness of about 10 μm can also be formed. It is therefore also possible to separate the substrate used at least in the first deposition stage from the layer formed from the intrinsically conductive polymer so as to obtain moldings which consist exclusively of the intrinsically conductive polymer.

The process stages described can be carried out both as separate stages in a discontinuous process (film pieces, glass plates, fibre rolls) and in a continuous process. For example, a concentration between 0.1 and 5% of PAni (complexed) is selected in a dispersion in an open bath. An endless roll of a PC or PET film is drawn through this bath at a rate of 0.1 to over 1 m/minute. Above the bath 1 to 3 IR lamps are arranged at a distance of approx. 15 cm, so that on the one hand a complete drying of the film takes place and on the other hand the temperature is not too high (danger of distortion or melting). If an increase in the conductivity is desired it can be after-doped (>30 minutes) in an aqueous acid bath (e.g. 1M, HCl, organic sulfonic acids etc.).

Surprisingly, almost any substance, material, work-piece, semi-finished product or end product can be used as the substrate on which the layers are applied. The following substances could be successfully coated using the process described:

metals (gold, platinum, iron, steel, copper, aluminium)

semiconductors (silicon, gallium arsenide) plastics (PE, PTFE, PA, PC, PET, epoxy resins, incl. those made conductive, in the form of powder, granulate, plates, mouldings, films, fibres, textiles etc.); here the adhesive strength on polar substances is better than on non-polar, and non-polar substances should therefore be pretreated by sulfonation, corona-discharging or the like natural product s and product s manufactured therefrom (wood, cotton, wool)

glasses ($SiO_2$, Iu/Su-glass (ITO), $SnO_2$)

pigments ($TiO_2$, carbon black, inorganic, e.g. cadmium pigments, organic, e.g. azo pigments)

synthetic and natural fillers used in the processing of rubber and plastics (chalk, talc, silicic acids, glass fibres, carbon fibres, inorganic whiskers etc.), one can therefore speak of the unlimited applicability of the process on the most varied substrates.

The finished coatings have both known and surprising properties which are interesting for different uses:

the layers are transparent the conductivity can be adjusted from approx. $10^{-9}$ up to approx. 10 S/cm, with coatings carried out particularly carefully it is possible to attain conductivities more than several powers of ten higher good to very good adhesion strength smooth, regular layer-thickness and surface preservation of the chemical (redox) properties (i.e.: the layers can be chemically or electrochemically compensated and complexed, oxidized and reduced; this changes color, conductivity and chemical potential), high thermo-stability in contact with, e.g. iron (steel), aluminium or other metals which are more base than silver it is clear that thin, dense metal-oxide layers are formed Schottky barriers.

The following areas of application are therefore possible without being a conclusive list:

antistatic and conductive modification of plastic (semi-finished product or product) surfaces, e.g. for packaging electronic components antistatic and conductive modification of surfaces, e.g. for the modification of electrodes (e.g. for catalysis or for the reduction of excess potential)

pre-treatment of plastic moldings for subsequent electroplating protection against corrosion capacitors electronic components solar cells transparent conductive glass coatings for voltage-controlled alteration of the absorption property, which can be adapted to solar radiation functional (e.g. piezo) ceramics transparent loud-speakers EMI-screening with transparent components (e.g. films, layers on glass (es), television screens etc.)

thin conductive paths by which even high current-densities can be transported.

The following examples are intended to explain the invention without however limiting it.

EXAMPLE 1

The substrates to be coated are suspended at the beginning of the reaction for 10 minutes in the reactor in which the intrinsically conductive polymers are polymerized according to European published application 329 768. For example, this is carried out during a polymerization of polyaniline with benzenesulfonic acid as the counter-ion with a PET film PE plate platinum electrode glass plate.

After coating, the substrates to be coated are washed intensively with 1M aqueous benzenesulfonic acid solution, and then with toluene and dried in air. The coating is not scratch-resistant.

The substrates are then heat-treated in an evacuated glove box on a thermostat-controlled hot-plate for 30 min. at 110° C. After this the layers adhere extremely firmly. The layer thickness is about 500 nm, the layer is an intensive green color but is clear and transparent. The specific conductivity is (measured on the PET film and on the glass plate) approx. 5–10 S/cm. Thinner and optically less dense layers are obtained if a shorter contact time is selected. The surface resistance is then about $10^5$ ohms (specific conductivity still 5–10 S/cm).

EXAMPLE 2

The substrates to be coated

PET film polyester fibers

Pt electrodes gold electrodes glass plate are immersed in a dispersion of polyaniline in DMSO produced as in EP-A-168 620. After a few minutes a transparent slightly green layer has been deposited. The thickness of the layer is considerably less than 400 nm. The heat-treatment takes place as in Example 1, in the case of fibers under a nitrogen atmosphere (in the glove box) and under IR radiation. Conductivity approx. $10^{-1}$ S/cm.

EXAMPLE 3

Piezo-electric ceramics silicon semiconductors (wafers)

are coated as in Examples 1 and 2.

Comparable results hi layer thickness and conductivity are obtained. The ceramics can be used as piezo emitters.

The coated semiconductor exhibits Schottky characteristics.

EXAMPLE 4

A paint produced according to the instructions in European published application 329 768 or a coating compound (PVC-copolymer lacquer; a polyurethane lacquer produced in a similar manner is equally suitable) are applied to a steel plate aluminium foil, dried and heat-treated as described in Example 1. Following this, the coated plates are washed with toluene, during which the majority of the applied lacquer layer can be washed off in the form of a suspension/dispersion. A thin layer remains which according to FT-IR and elementary analysis consists of polyaniline and (an under-lying?) oxide layer.

A capacity measurement gives further indications that an oxide layer has formed between the metal and the PAni layer (capacity: 200 nF). The PAni layer can also not be removed by pyrolysis under nitrogen (can be determined by FT-IR and RFA analysis).

EXAMPLE 5

As in Examples 1 to 4, other intrinsically conductive polymers which are synthesised as in Example 2 of European published application 329 768 and are dispersed according to EP-A-168 620 can be used. Here thin conductive layers with the following color are obtained:

| Polymer | Doping agent | Colour |
| --- | --- | --- |
| aniline | HX (X = halogen) e.g. HCl, HBr, RSO$_3$H e.g. 4-toluene-sulfonic acid CH$_3$SO$_3$H | green |
| pyrrole | benzenesulfonic acid C$_{12}$H$_{26}$RSO$_3$H | violet/ grey |
| thiophene | benzene sulfonic acid C$_{12}$H$_{26}$RSO$_3$H FeCL$_3$ | red |
| dihydro-isothianaphthene | O$_2$, FeCl$_3$ RSO$_3$H | blue |

EXAMPLE 6

In a variant of the dispersion coating described in Example 1, in which the specifications in European published application 329 768 are followed, the procedure is as follows:

57.6 g of p-toluenesulfonic acid (industrial quality) is dissolved in a beaker in 3 liters of water. 20 ml of aniline is added to this. In another beaker 32 g of peroxydisulphate is dissolved in 165 ml of H$_2$O and placed into a dropping funnel. The synthesis is carried out according to the specifications in the aforementioned PCT application with cooling, gentle stirring and maintaining a potential of 670 mV. The layers to be coated are brought into contact with the prepared dispersion of the freshly formed polyaniline/p-toluenesulfonic acid salt either at the beginning of the reaction or in the first hour of the implementation of the reaction for about 10 minutes. It emerges that it is not essential for coating that the peroxide solution is added in drops during the contact time. The addition of peroxide can even be interrupted, uncoated substrates can be suspended in the beaker and after a contact time with the dispersion of a few minutes (approx. 10–20 minutes) the already coated substrate can be removed and then the reaction can be continued as indicated above. What is decisive for the success of the dispersion coating is the presence of an extremely fine dispersion of the already polymerised PAni-pTs polymer. The already coated substrates are dried and heat-treated as above.

The layers obtained on PET films according to this variant (other substrates can also be used) are, depending on the contact time with the dispersion, between 50 and 80 to 400 and 500 nm thick. The layers obtained according to this variant exhibit a specific conductivity after cleaning and drying of 10 to 200 S/cm.

EXAMPLE 7

Production of a dispersion of neutral polyaniline in DMSO

A polyaniline powder produced according to the process in the PCT application is washed 3–6 times with aqueous 3M ammonia solution. The PAni is thereby compensated. The thus prepared PAni is filtered off and carefully dried (ambient temperature, rotation-evaporator). The water content after drying should be less than 50%. The dried PAni powder is dispersed in DMSO by supplying high dispersion energy (e.g. ultra-sound or Ultra-turrax). The powder must be carefully added here in small stages to avoid agglomeration.

Immediately after the first addition of the PAni powder, the dispersion color deep blue.

According to the amount added and the particle size of the PAni used, the dispersion at a content of 0.5 to 5% becomes viscous, above this concentration it forms a pourable gel.

A dispersion produced thus is freed from gel-like and rubber-like parts through a coarse mesh screen (e.g. a metal screen) and afterwards freed from smaller agglomerates and impurities through a finer filter. DMF, THF or other suitable solvents can be used in place of DMSO.

EXAMPLE 8

Production of a dispersion suitable for the coating process.

A dispersion from Example 7, preferably near to the gel limit, is diluted in the ratio 1:1, e.g. with isopropylalcohol (other solvents are also suitable, but clearly less so) which contains the doping acid (e.g. DBSH) in a concentration of approx. 0.75 times the PAni concentration in the DMSO dispersion. With a 2% PAni/DMSO dispersion the DBSH content in isopropanol must therefore be approx. 1.5%. If too much acid, e.g. DBSH, is used the dispersion flocculates.

Coatings can therefore be produced with a dispersion produced in this way. The layer thickness can be varied by coating several times or by dilution of the dispersion with isopropanol. A dilution of 1:1 has proved effective for the production of coatings with good transparency.

EXAMPLE 9

Coating process (e.g. PC).

Take a polycarbonate film cleaned with methanol and immerse this in a dispersion from Example 8. On removal take care that the dispersion drains off evenly.

The best adhesion strength is achieved with drying using IR radiation, however drying in the hot-air oven from 80°–140° C. is also possible.

A film coated in this way, is greenish transparent and the surface resistance is approx. $10^6$ ohms. It can be markedly reduced by after-complexing with, e.g. para-toluenesulfonic acid or HCl, e.g. to $10^3$ ohms. The specific conductivity is approx. 1 S/cm.

We claim:

1. Process for the production of at least one conductive layer of insoluble intrinsically conductive polymers, said polymers being polyaniline polymers, which are insoluble in solvents consisting of organic solvents or solvents with a solubility parameter of <11 $(cal/cm^3)^{1/2}$, on a substrate wherein the conductive layer has a specific conductivity of >$10^{-2}$ S/cm, comprising the steps of:

depositing on the substrate said at least one layer of the conductive polymers from a metastable dispersion of the insoluble intrinsically conductive polymers in a dispersion, having concentration of said polymers in said dispersion from $10^{-5}\%$ to 5% by weight in said solvents;

heating said substrate; and drying said substrate.

2. Process according to claim 1, wherein said depositing step is conducted without an electric current.

3. Process according to claim 1, wherein said conductive layer has a layer thickness of <10 μm.

4. Process according to claim 1, wherein layer thickness is increased by depositing more than one conductive layer on the substrate of the conductive polymers from the dispersion.

5. Process according to claim 1, wherein after the conductive layer is deposited on the substrate, the dispersant is removed.

6. Process according to claim 1, wherein the heating step is conducted at a temperature of over 60° C., and thereafter the substrate is cooled.

7. Process according to claim 1, wherein the heating and drying steps are conducted simultaneously.

8. Process according to claim 7, wherein the heating step is conducted in an inert atmosphere or under reduced pressure (vacuum).

9. Process according to claim 8, wherein the heating step is conducted by direct contact with a heat source, by infra-red radiation or by microwaves.

10. Method of using the process in claim 8 for corrosion protection and for (transparent) anti-static finishing.

11. Method of using the process in claim 8 to produce transparent components.

12. Method of using the process in claim 8 for producing solar cells.

13. Process according to claim 1, wherein after one conductive layer is deposited on the substrate, the substrate is separated from the layer.

14. Process according to claim 1, wherein the said solvent is an aqueous media.

15. Process according to claim 1, wherein the substrate is a material selected from the group consisting of plastics, ceramics, wood, cotton, wool, glasses, pigments, fillers, carbon blacks, and metals.

16. A process according to claim 15, wherein the substrate is cleaned before the depositing step.

17. Process according to claim 1, wherein the depositing step is conducted at temperatures above 25° C.

18. Process according to claim 17, wherein the heating step is conducted during the depositing step.

19. A process according to claim 1, wherein said dispersion comprises insoluble organic polymers, converted by oxidation agents or acids into an electrically conductive form, and said solvents having a solubility parameter of $\geq 8.6$ (cal/cm$^3$)$^{1/2}$, and being filterable.

20. A process according to claim 1, wherein said dispersion is produced by a process comprising the steps of:

dispersing an already polymerized, cleaned conjugated organic polymer in neutral (not complexed) form in dimethylsulfoxide (DMSO), dimethylformamide (DMF), tetrahydrofuran (THF) or another solvent with about the same or a higher solubility parameter as DMSO, DMF or THF, to form a pre-dispersion and diluting said pre-dispersion with a solvent having a solubility of $>8.6$ (cal/cm$^3$)$^{1/2}$.

21. A process according to claim 20 wherein the conjugated organic polymer is dried before the dispersing step.

22. A process according to claim 20 wherein after the diluting step the neutral conjugated polymer is converted with an acid into a conductive complexed form.

23. Method of using the process in claim 8, for pretreating plastic moldings for subsequent electro-plating; for packaging electronic components; for producing non-black, colored, and antistatic synthetic fibers in semiconductor science; for producing diodes, transistors, field-effect transistors, piezo electric impulse-emitters, and electrochromic displays; for voltage-controlled absorption of sun-light; for electromagnetic screening; and for light-guides.

24. Process according to claim 1 wherein the substrate is a semi-conductor.

25. The process according to claim 1 wherein the substrate is fibers.

26. The process according to claim 1 wherein the substrate is textiles.

27. The process according to claim 1 wherein the intrinsically conductive polymers are reversibly doped, not containing any counter-ions with a molecular weight of more than 1,000.

\* \* \* \* \*